(12) United States Patent
Sahni et al.

(10) Patent No.: US 11,030,639 B1
(45) Date of Patent: Jun. 8, 2021

(54) BEACON MALL EXPERIENCE

(71) Applicant: Wells Fargo Bank, N.A., San Francisco, CA (US)

(72) Inventors: Bipin M. Sahni, San Francisco, CA (US); Uma Meyyappan, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 14/745,245

(22) Filed: Jun. 19, 2015

Related U.S. Application Data (60) Provisional application No. 62/015,246, filed on Jun. 20, 2014, provisional application No. 62/017,681, filed on Jun. 26, 2014.

(51) Int. Cl.
| | |
|---|---|
| *G06Q 30/02* | (2012.01) |
| *H04W 4/021* | (2018.01) |
| *G06Q 10/02* | (2012.01) |
| *G01C 21/00* | (2006.01) |

(52) U.S. Cl.
CPC ......... *G06Q 30/0226* (2013.01); *G01C 21/00* (2013.01); *G06Q 10/02* (2013.01); *G06Q 30/0201* (2013.01); *G06Q 30/0261* (2013.01); *G06Q 30/0267* (2013.01); *G06Q 30/0281* (2013.01); *H04W 4/021* (2013.01)

(58) Field of Classification Search
CPC ....... H04W 4/02; H04W 4/008; H04W 4/021; G06Q 30/0207; G06Q 30/0251; G06Q 30/0238; G06Q 30/0226; G06Q 30/0211; G06Q 30/0209; G06Q 30/0281; G06Q 30/0284; G06Q 30/0261; G01S 1/72; G01S 5/0295

USPC .................................................. 701/522, 433
See application file for complete search history.

(56) References Cited

U.S. PATENT DOCUMENTS

| | | | |
|---|---|---|---|
| 6,320,496 B1 | 11/2001 | Sokoler et al. | |
| 7,934,639 B1 * | 5/2011 | Chen ...................... | G06Q 20/20 235/375 |
| 8,334,792 B2 | 12/2012 | Kim | |
| 9,264,151 B1 * | 2/2016 | Emigh ............... | G06Q 30/0211 |
| 2003/0018530 A1 * | 1/2003 | Walker ................... | G06Q 20/10 705/14.25 |

(Continued)

FOREIGN PATENT DOCUMENTS

CN 102768353 A 11/2012

*Primary Examiner* — Isaac G Smith
(74) *Attorney, Agent, or Firm* — Foley & Lardner LLP

(57) ABSTRACT

Systems and methods that provide mobile and analytic capabilities that may be utilized by retailers and mall operators are described. The systems and methods include mobile capabilities, such as the offering of a smartphone application to customers of the retailers and the malls. The mobile application provides the customers with an elevated shopping experience and includes a unique rewards program that drives repeat business and increases customer foot traffic to the mall and retailers. The mobile application also provides retailers and mall operators customer-specific analytics. The customer-specific analytics may be used to provide an improved shopping experience for the customers including, but not limited to, customer-specific advertisements, customer-specific greetings, location-based information, and the like.

42 Claims, 6 Drawing Sheets

(56) References Cited

U.S. PATENT DOCUMENTS

| | | | |
|---|---|---|---|
| 2011/0178863 A1* | 7/2011 | Daigle | G06Q 30/0231 |
| | | | 705/14.31 |
| 2013/0005437 A1* | 1/2013 | Bethke | G06Q 30/0209 |
| | | | 463/25 |
| 2013/0066731 A1* | 3/2013 | Finnegan | H04W 4/21 |
| | | | 705/15 |
| 2013/0079037 A1* | 3/2013 | Dobyns | H04W 4/023 |
| | | | 455/456.3 |
| 2013/0122934 A1 | 5/2013 | Branch et al. | |
| 2013/0191251 A1* | 7/2013 | Martin | G06Q 30/0601 |
| | | | 705/26.61 |
| 2013/0211899 A1* | 8/2013 | Nagpal | G06Q 30/0234 |
| | | | 705/14.25 |
| 2013/0260790 A1* | 10/2013 | Itzhaki | H04W 4/02 |
| | | | 455/456.1 |
| 2014/0032326 A1* | 1/2014 | Li | G06Q 30/0266 |
| | | | 705/14.58 |
| 2014/0129305 A1* | 5/2014 | Frame | G06Q 30/0211 |
| | | | 705/14.13 |
| 2014/0278886 A1* | 9/2014 | Roka | G06Q 30/0226 |
| | | | 705/14.27 |
| 2014/0350855 A1 | 11/2014 | Vishnuvajhala | |
| 2014/0379480 A1* | 12/2014 | Rao | G06Q 30/0261 |
| | | | 705/14.58 |
| 2015/0248702 A1* | 9/2015 | Chatterton | G06Q 30/0261 |
| | | | 705/14.58 |
| 2015/0262265 A1* | 9/2015 | Zamer | H04W 4/02 |
| | | | 705/347 |

* cited by examiner

BEACON MALL EXPERIENCE

CROSS-REFERENCE TO RELATED APPLICATIONS

This application claims the benefit of priority to U.S. Provisional Patent Application No. 62/015,246, entitled "BEACON MALL EXPERIENCE," filed on Jun. 20, 2014, and to U.S. Provisional Patent Application No. 62/017,681, titled "BEACON MALL EXPERIENCE," filed on Jun. 26, 2014, both of which are herein incorporated by reference in their entireties and for all purposes.

TECHNICAL FIELD

The present disclosure relates to systems and methods that provide mobile and analytic capabilities that may be utilized by retailers and mall operators.

BACKGROUND

Shopping malls provide a plurality of merchants (e.g., shops, movie theaters, restaurants, etc.) at a single location. Customers can shop at a plurality of merchants on a single shopping outing. However, customer foot traffic to shopping malls is on the decline. The decline is attributed in part to the ease of shopping via the Internet.

SUMMARY

One embodiment relates to a method of providing location-specific content to a customer of a shopping center. The method includes receiving, by a computing system, a first beacon identifier relating to a first location of a mobile device associated with the customer, wherein the first location is in the shopping center. The method further includes determining, by the computing system, the first location of the mobile device based on the first beacon identifier. The method includes storing, by the computing system, location information relating to the first location with a customer entry in a customer database, the customer entry associated with the customer, wherein the customer database includes location and purchase information relating to a plurality of customers.

Another embodiment relates to a computing system for providing location-specific content to a customer of a shopping center. The customer is associated with a customer device. The system includes a plurality of beacons positioned at different locations of the shopping center. Each of the plurality of beacons includes a radio frequency transmitter that transmits a beacon identifier. Each of the beacons is associated with a different beacon identifier. The system further includes a mall computing system having a network interface configured to permit data communication between the mall computing system and a plurality of mobile devices associated with a plurality of customers of the shopping center, a memory, and a processor. The processor is configured to receive a first beacon identifier of a first beacon of the plurality of beacons. The first beacon identifier relates to a first location of a mobile device associated with the customer. The processor is further configured to determine the first location of the mobile device based on the first beacon identifier. The processor is configured to store location information relating to the first location with a customer entry in a customer database. The customer entry is associated with the customer. The customer database includes location and purchase information relating to a plurality of customers.

These and other features, together with the organization and manner of operation thereof, will become apparent from the following detailed description when taken in conjunction with the accompanying drawings.

DETAILED DESCRIPTION

Referring generally to the figures, systems and methods that provide mobile and analytic capabilities that may be utilized by retailers and mall operators are described. The systems and methods include mobile capabilities, such as the offering of a smartphone application to customers of the retailers and the malls. The mobile application provides the customers with an elevated shopping experience and includes a unique rewards program that drives repeat business and increases customer foot traffic to the mall and retailers. The mobile application also provides retailers and mall operators customer-specific analytics. The customer-specific analytics may be used to provide an improved shopping experience for the customers including, but not limited to, customer-specific advertisements, customer-specific greetings, location-based information, and the like.

Figure 1:
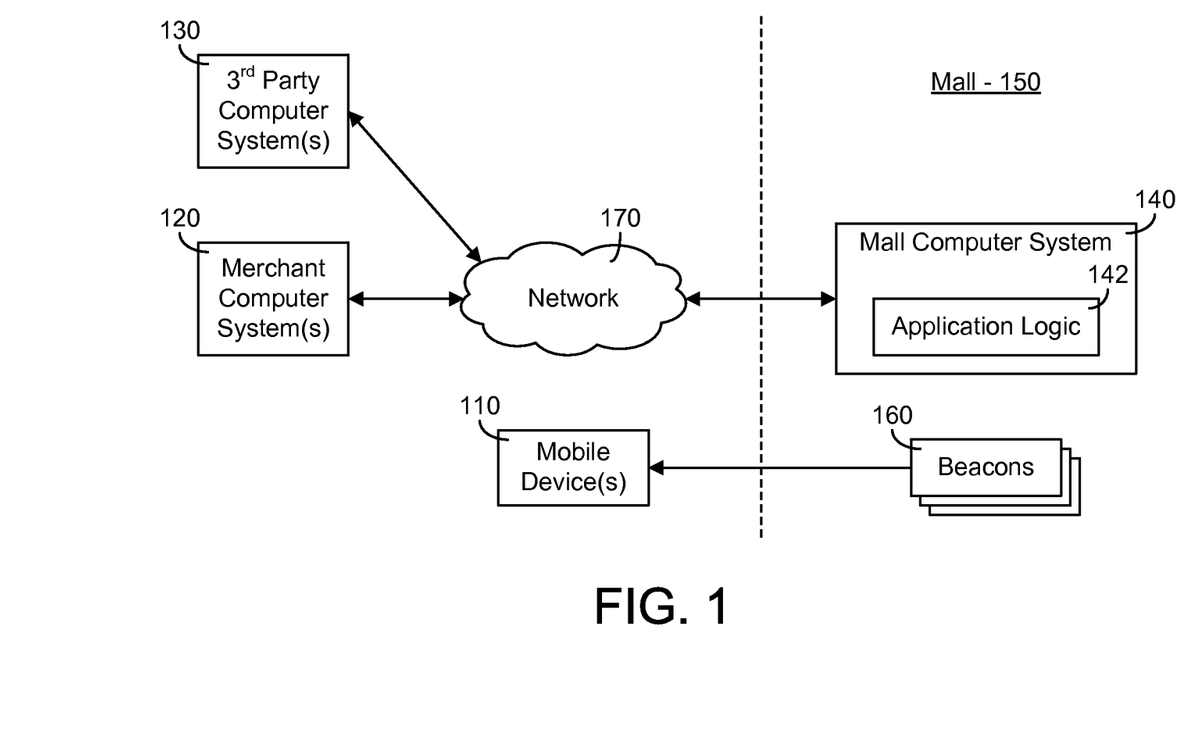
FIG. 1 is a block diagram of a computer system according to an exemplary embodiment.

Referring to FIG. 1, a block diagram of a computer system 100 is shown according to an exemplary embodiment. The computer system 100 includes mobile devices 110, merchant computer systems 120, third party computer systems 130, and a mall computer system 140. The mall computer system 140 is associated with a mall 150. The mall 150 includes a physical location that can be visited by customers. The mall 150 includes various merchants (e.g., retailers, restaurants, movie theaters, service providers, etc.) that may be visited by the customers to make purchases. The mall 150 also includes a plurality of beacons 160 positioned about the physical location of the mall 150 (e.g., inside the mall, around the parking area of the mall, etc.). As described in further detail below, each of the plurality of beacons 160 geo-fences a specific area of the mall 150 such that location-based services can be provided to customers having a mobile device 110. The mobile devices 110, the merchant computer systems 120, the third party computer systems 130, and the mall computer system 140 can communicate with each other via a network 170 (e.g., the Internet).

The mobile devices 110 may, for example, be smartphones, tablets, computerized eyewear, computerized watches, and so on. The mobile devices may have various applications installed thereon, including a mall application, merchant applications, white label applications, and third party applications. The customer may walk into the physical location of the mall 150 with the mobile device 110. The location of the mobile devices 110 in or near the physical location of the mall 150 can be determined based on the various beacon identifiers broadcasted by the plurality of beacons 160 and detected by the mobile devices 110. Based on the detected location of the mobile devices 110, the mall computer system 140, the third party computer systems 130, and the merchant computer systems 120 can send location-specific and customer specific information to the mobile devices 110.

The third party computer systems 130 are computer systems associated with entities other than the mall 150 and the merchants located within the mall 150. The third party computer systems 130 may provide services such as location services, gift card services, banking services, and the like.

The merchant computer systems 120 are computer systems associated with the various merchants within the mall 150. The merchant computer systems 120 may provide backend support for merchant specific applications (e.g., a merchant specific smartphone application), merchant gift cards, a merchant website, a merchant credit card system, and the like.

The mall computer system 140 is operated by the owner or operator of the mall 150. In alternative arrangements, the mall computer system 140 is operated by a third-party, such as a financial institution, as part of a service offered to the mall 150. The mall computer system 140 may provide backend support for the mall 150 and other malls owned or operated by the operator. The back end support may include supporting a mall specific website, mall specific services, interfacing with the third party computer systems 130 and the merchant computer systems 120, and the like. The mall computer system 140 includes application logic 142. The application logic 142 allows the mall computer system 140 to communicate with mall applications being executed by the mobile devices 110. The operator of the mall computer system 140 (i.e., the mall 150 or the third-party operating the system) may release a software development kit ("SDK") that provides for the creation of third-party applications to interact and interface with the mall computer system 140. For example, the merchant computer systems 120 and the third-party computer systems 130 may use the SDK to integrate the described location-based features of the system 100 into their own applications (e.g., into a merchant loyalty program).

Figure 2:
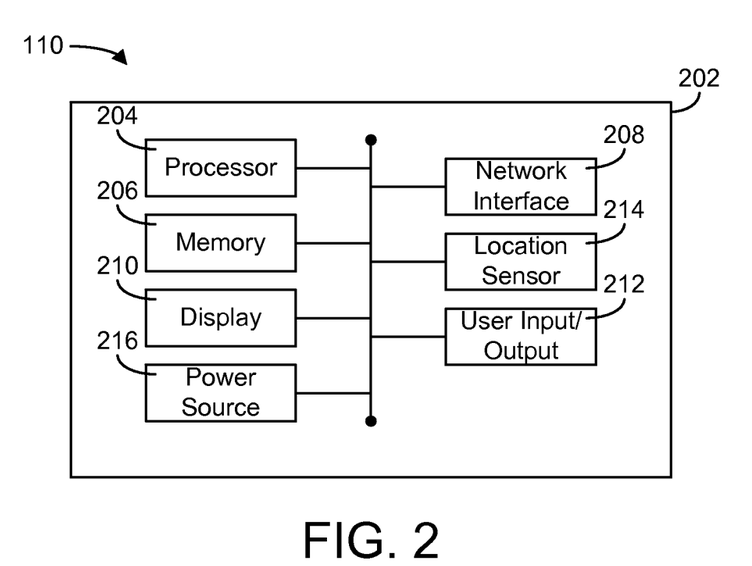
FIG. 2 is a block diagram of the mobile device of FIG. 1 according to an exemplary embodiment.

Referring to FIG. 2, a block diagram of the mobile device 110 is shown according to an exemplary embodiment. As discussed above, the mobile device 110 is a personal computing device (e.g., a desktop, laptop, tablet computer, PDA, smartphone, feature phone, portable media device, or the like). The mobile device 110 includes a housing 202. The housing 202 is coupled to the various electrical components of the mobile device 110. The mobile device 110 includes a processor 204 and memory 206. The memory 206 includes program modules that, when executed by the processor 204, control the operation of the mobile device 110. The memory 206 may also store various applications, such as an application of the financial institution 102 that facilitates communication between the mobile device 110 and the various computing systems of the financial institution 102. The memory 204 may include any combination of RAM, ROM, NVRAM, or the like.

The mobile device 110 includes at least one network interface 208. The network interface 208 is a wireless network interface. The wireless network interface 208 includes any of a cellular transceiver (e.g., CDMA, GSM, LTE, etc.), a wireless network transceiver (e.g., 802.11X, ZigBee, Bluetooth, etc.), or a combination thereof (e.g., both a cellular transceiver and a Bluetooth transceiver). The network interface 208 is capable of receiving radio frequency transmissions from the beacons 190. Additionally, the network interface 208 is capable of communicating with the backend system 106 of the financial institution 102 via the network 110 (e.g., the Internet as accessed through a cellular data network).

The mobile device 110 includes a display 210 and a user input/output 212. In some arrangements, the display and the user input/output are combined (e.g., as a touchscreen display device). In other arrangements, the display 210 and the user input/output 212 are discrete devices. The display 210 can present system messages (e.g., push notifications, text messages, etc.) to the user. The user input/output 212 includes any of speakers, keyboards, notification LEDs, microphones, biometric sensors (e.g., fingerprint scanners), buttons, switches, cameras, or a combination thereof.

In some arrangements, the mobile device 110 includes a location sensor 214. The location sensor 214 may be used to supplement location information determined based on the received beacon identifiers.

The mobile device 110 includes a power source 216. The power source 216 may include any combination of grid power and battery power (e.g., alkaline batteries, rechargeable batteries, etc.). In arrangements where the power source 216 is a rechargeable battery, the mobile device 110 also includes the necessary circuitry to recharge the battery.

Figure 3:
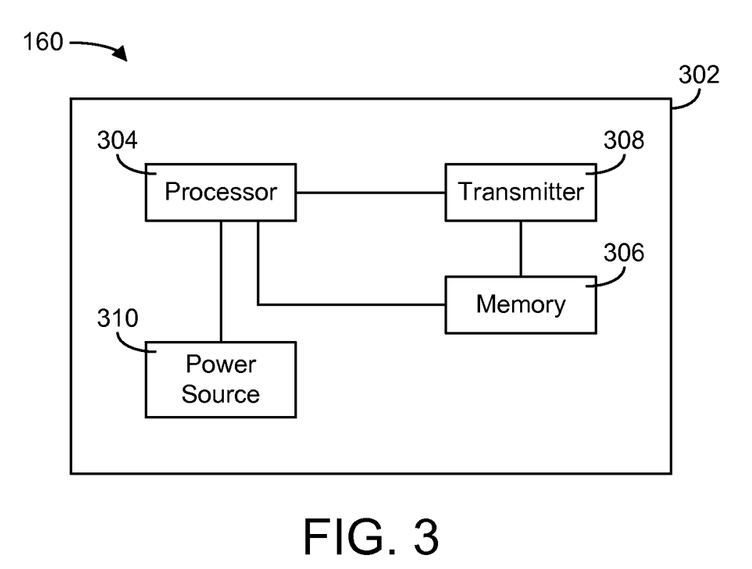
FIG. 3 is a block diagram of a beacon of FIG. 1 is shown according to an exemplary embodiment.

Referring to FIG. 3, a block diagram of a beacon 160 is shown according to an exemplary embodiment. The beacon 160 includes a housing 302 that is coupled to various electrical components. The beacon 160 includes a processor 304 and memory 306. The memory 306 includes program modules that, when executed by the processor 304, control the operation of the beacon 160. The memory 304 may include any combination of RAM, ROM, NVRAM, or the like. The unique beacon identifier of the beacon 160 is programmed into the memory. The beacon 160 includes a radio frequency transmitter 308. The transmitter 308 may be a Bluetooth® transmitter 308. In some arrangements, the transmitter 308 is a transceiver capable of sending and receiving radio frequency transmissions. The beacon 160 includes a power source 310. The power source 310 may include any combination of grid power and battery power (e.g., alkaline batteries, rechargeable batteries, etc.). In some arrangements where the power source 310 is a battery, the beacon 160 is capable of transmitting the unique beacon identifier for at least a year without replacing or recharging the battery.

Figure 4:
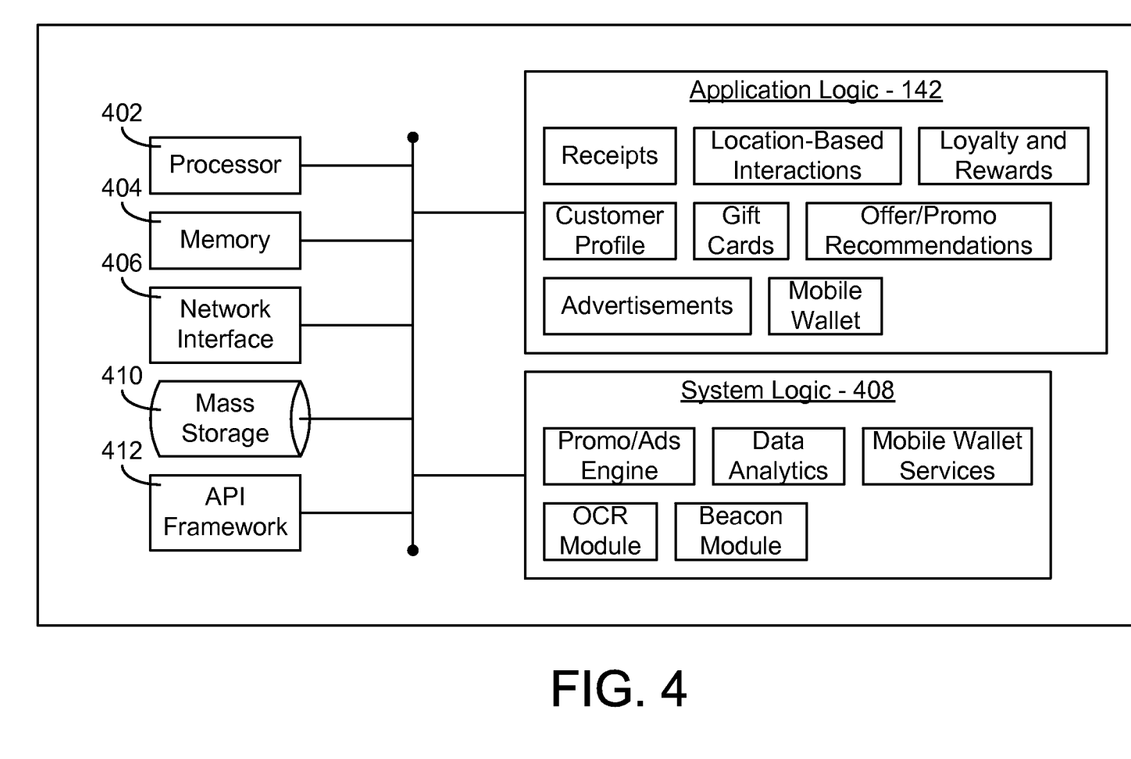
FIG. 4 is a block diagram of the mall computer system of FIG. 1 according to an exemplary embodiment.

Referring to FIG. 4, a block diagram of the mall computer system 140 is shown according to an exemplary embodiment. As shown in FIG. 4, the mall computer system 140 is embodied as a server. As such, the mall computer system includes a processor 402 and a memory 404. The memory 404 includes program modules that, when executed by the processor 402, control the operation of the mall computer system 140. The mall computer system 140 includes at least one network interface 406. The network interface 406 is a wireless network interface (e.g., 802.11X, ZigBee, Bluetooth, etc.), a wired network interface (e.g., Ethernet), or a combination thereof. The network interface 406 is configured to permit data communication between the mall computer system 140 and the mobile devices 110, the merchant computer systems 120, and the third party computer systems 130 via the network 170.

The mall computer system 140 includes the application logic 142. The application logic 142 includes various programming modules associated with the mall application (the application being executed by the mobile devices 110 associated with the mall 150). In some arrangements, the programming modules are executed by the processor 402. In some arrangements, the SDK provided by the mall computer system 140 allows access to the application logic 142. As shown in FIG. 4, the application logic 142 may include, but is not limited to, any of the program modules discussed below in Table 1.

TABLE 1

| Module Name | Module Function |
| --- | --- |
| Receipts | Provides the logic to allow customers to take a picture of receipts of purchases made at the mall 150 such that the purchases can be credited to loyalty or reward accounts of the customers. |
| Location-Based Interactions | Provides the logic to provide location-specific services to customers via the mall application based on detected locations of the customers. |
| Loyalty and Rewards | Provides the logic to allow customers to earn points that can later be redeemed for services and goods. |
| Customer Profile | Provides the logic to allow customers to create, edit, and store customer profiles with the mall 150. |
| Gift Cards | Provides the logic to allow customers of the mall 150 to purchase and redeem gift cards. |
| Offer/Promo Recommendation | Provides the logic to select offers and promotions to send to customers based on customer preferences and habits and to push the offers or promotions to the customers. |
| Advertisements | Provides the logic to select advertisements to customers based on customer preferences and habits and to push the advertisements to the mobile devices 110 associated with the customers. |
| Mobile Wallet | Provides the logic to allow customers to pay for purchases at the mall 150 via a mobile wallet associated with accounts (e.g., an account held at a third party financial institution) of the customers. |

The mall computer system 140 includes system logic 408. The system logic 408 includes various programming modules used by the mall computer system 140 in providing the application modules 142. In some arrangements, the SDK provided by the mall computer system 140 allows access to the system logic 408. The programming modules are executed by the processor 402. As shown in FIG. 4, the system logic 408 includes, but is not limited to, any of the program modules discussed below in Table 2.

TABLE 2

| Module Name | Module Function |
| --- | --- |
| Promo/Advertisement Engine | Provides the logic to interface with third party computer systems 130, merchant computer systems 120, and other external databases to receive promotional and advertisement information to provide to customers of the mall 150. |
| Data Analytics | Provides the logic to monitor and maintain information on customers of the mall 150 and to perform various analytics on the information. |
| Mobile Wallet Services | Provides the logic necessary to interface with external systems (e.g., an third party banking system) to provide mobile wallet services to customers of the mall 150. |
| OCR Module | Provides the logic necessary to convert pictures including text into machine-readable text (e.g., in response to a customer scanning a sales receipt). |
| Beacon Module | Provides the logic necessary to locate mobile devices 110 based on received beacon identifiers. |

As shown in FIG. 4, the application logic 142 and the system logic 408 are separate from the memory 404. In some arrangements, the application logic 142 and the system logic 408 are both stored in the memory 402.

Still referring to FIG. 4, the mall computer system 140 includes mass storage 410. Mass storage 410 includes any databases stored by the mall computer system 140. The databases may include customer account databases, customer information databases, beacon-location association databases, merchant information databases, third party information databases, and the like.

The mall computer system 140 includes an API ("application programming interface") framework 412. The API framework 412 provides access to the services provided by the mall computer system 140 to the merchant computer systems 120 and the third party computer systems 130. The API framework 412 may be integrated into the SDK provided by the mall computer system 140. The API framework 412 allows the merchant computer systems 120 and the third party computer systems 130 to integrate various mall application program aspects into third party applications (e.g., smartphone applications for the merchants or third parties). Additionally, the API framework 412 allows gathered statistical data (e.g., customer demographics, customer spending habits, etc.) to be utilized by the merchant computer systems 120 and the third party computer systems 130.

Figure 5:
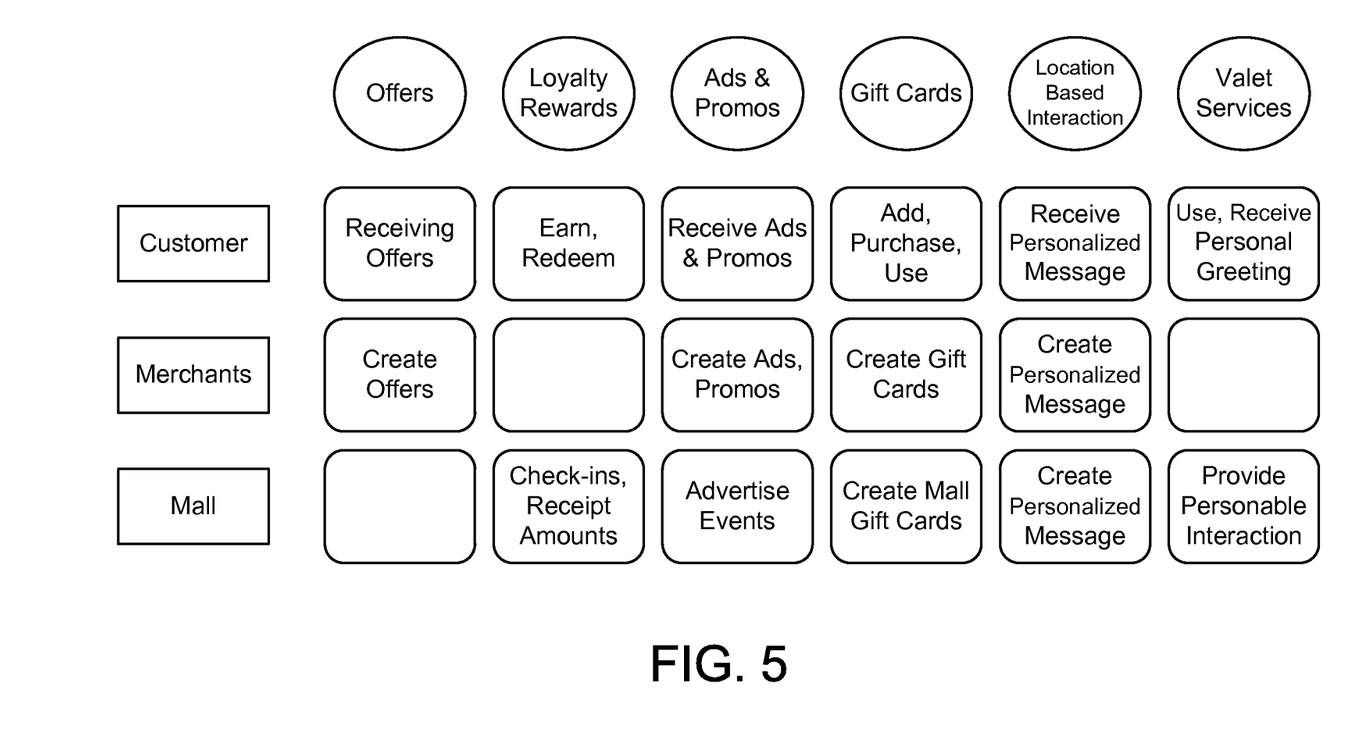
FIG. 5 is a block diagram of a summary of services provided to customers by the computing system of FIG. 1.

Referring to FIG. 5, a block diagram of a summary of services provided to customers of the mall 150 by the computing system is shown. As shown in FIG. 5, customers of the mall 150 can receive offers, earn and redeem loyalty points, receive advertisements and promotions, purchase and use gift cards, receive personalized messages, and use valet services offered at the mall 150. Merchants (e.g., a retailers at the mall 150) can create offers, create advertisements and promotions, create gift cards, and create personalized messages that are sent to the customers. The operators or owners of the mall 150 can monitor customer check ins and receipt amounts to award loyalty points to customers, advertise mall events to customers, create mall gift cards, create personalized messages, and provide personable valet interactions through the computing system 100.

Figure 6:
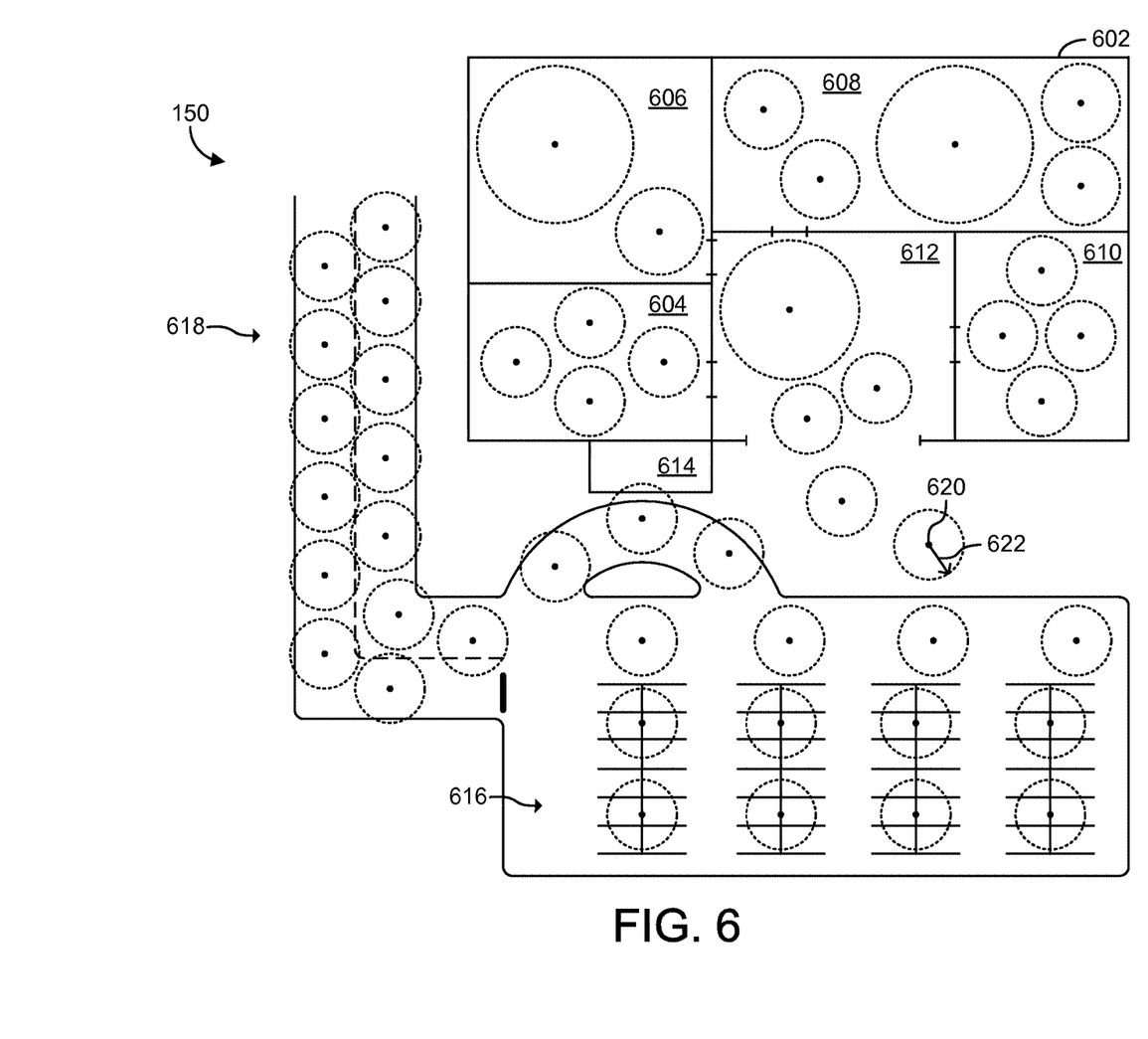
FIG. 6 is a view of the mall of FIG. 1 according to an exemplary embodiment.

Referring to FIG. 6, a view of the mall 150 is shown according to an exemplary embodiment. The mall 150 includes a main building 602 having a first merchant 604, a second merchant 606, a third merchant 608, a fourth merchant 610, and a main area 612. The merchants 602-610 may be any of stores, restaurants, service providers, movie theaters, or the like. Outside of the main building 602, the mall 150 includes a valet stand 614. Through the valet stand 614, the mall 150 provides customers with a valet car service. The mall 150 further includes a parking lot 616 and a driveway 618. Beacons 620 are placed throughout the mall area (e.g., both inside of and outside of the main building 602). Each beacon 620 broadcasts a unique identifier at a broadcast radius 622. The broadcast radius 622 of each beacon 620 may be varied by altering a broadcast power of each beacon 620. Although not shown in FIG. 6, the broadcast radius 622 may be a non-circular broadcast zone formed by placing the beacon in signal shaping device (e.g., by placing a beacon 620 in a partial enclosure comprised of material impermeable to radio frequencies).

As a user with a mobile device 110 running the mall application traverses through the grounds of the mall 150, the mobile device 110 receives different identifiers from the plurality of beacons 620. The received identifiers are reported from the mobile device to the mall computer system 140. Based on the reported identifiers, the mall computer system 140 is able to determine the location of the mobile device 110. Additionally, as the customer traverses from one beacon to the next beacon, the mall computer system 140 may also determine the direction (e.g., a trajectory) and speed in which the customer is traveling. The mall computer system 140 can use the location and heading information to push location-specific information to the mobile device 110. The location specific information may include targeted advertisements, promotions, map information, parking information, event information, and the like. Additionally, the mall computer system 140 can initiate alerts to mall employees based on approaching customers. For example, as a customer's car approaches the valet area 614, the mall computer system 140 can initiate an alert to a valet attendant working in the valet area 614 that indicates a certain customer is approaching the area. The alert may include a name of the customer along with a picture of the customer such that the valet attendant can greet the customer by name and offer a more personalized experience. The details and specific uses of the beacon location system of the mall 150 are described in further detail below.

Figure 7:
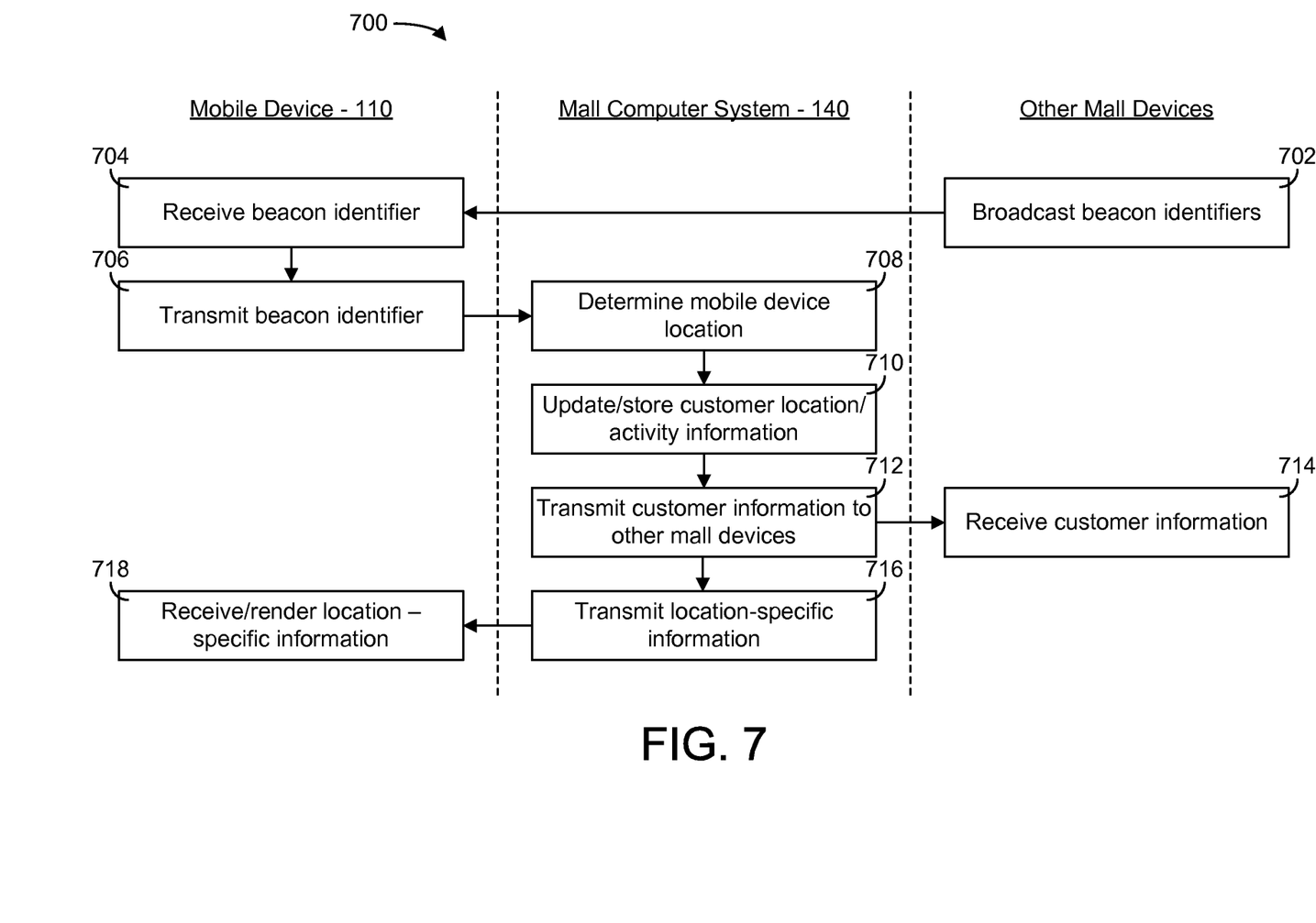
FIG. 7 is a flow diagram of a method of determining a customer location within the mall of FIG. 1 according to an exemplary embodiment.

Referring to FIG. 7, a flow diagram of a method 700 of determining a customer location within the mall 150 is shown according to an exemplary embodiment. FIG. 7 describes the interaction between the mall computer system 140, the mobile devices 110, and other mall devices (e.g., the beacons 160, the beacons 620, employee computing devices, etc.).

Beacon identifiers are broadcast at 702. The beacon identifiers are broadcast by beacons positioned within and outside of the mall 150 (e.g., as shown in FIG. 6). Each beacon wirelessly broadcasts a unique beacon identifier (e.g., a serial number) to a distance of a broadcast radius of the beacon. Each beacon is associated with an area and geo-fences that area with the broadcasted identifier. Accordingly, the location of devices in receipt of the beacon identifier is known to be within the broadcast range of the beacon associated with the identifier. The beacons broadcast the unique identifiers via wireless radio frequency (e.g., Bluetooth, Bluetooth Low Energy, etc.).

A mobile device 110 receives a beacon identifier at 704. The beacon identifier is received the processor 204 of the mobile device 110 via the network interface 208 (e.g., a Bluetooth transceiver). The received beacon identifier is transmitted from the mobile device 110 at 706. The beacon identifier is transmitted to the mall computer system 140 via the network 170 (e.g., the Internet system through the Internet. The transmission of the identifier is initiated by the mall application being executed by the processor 204 of the mobile device 110.

The mall computer system 140 determines the mobile device location at 708. The location of the mobile device 110 is determined based at least in part on the beacon identifier received by the mobile device 110. Since the mobile device 110 received a beacon identifier that is broadcast at a limited beacon radius, the mobile device 110 is known to be within the broadcast radius of the identified beacon. Accordingly, the mall computer system 140 compares the received beacon identifier to known beacon identifiers. In some arrangements, the known beacon identifiers are stored in a database in the mass storage 410. Each entry in the database associates a beacon identifier to a specific location (e.g., a specific spot in the main building 602, an area of the parking lot 616, an area within the first store 604, at the valet area 614, etc.).

The location information relating to the mobile device 110 is stored in a customer database at 710. The location information is stored in entries in a database stored in the mass storage 410. In some arrangements, each entry relates to an individual customer. In such arrangements, a customer identifier is received along with the location information at 708. The customer identifier may be a name or a username. In some arrangements, the customer has not registered with the mall computer system and wishes to remain anonymous. In such arrangements, the customer identifier is a serial number of the mobile device. Multiple entries relating to the same customer (named or anonymous) may be used to determine a direction of movement of the customer and a movement speed of the customer.

The stored location information may be used to award loyalty points to an account associated with the customer. For example, the customer may points for entering the mall 150, additional points for remaining in the mall 150 for a certain period of time, and points for being in certain locations within the mall 150 at designated points of time. The points may be accrued and stored in the customer's account for later redemption (e.g., for free valet parking, for free movie tickets, for gift cards, etc.).

The stored location information may be analyzed by the mall computer system 140. In some arrangements, the stored location information is used to perform various customer analytics. The customer analytics may relate to customer trends such as purchasing trends, time most likely to be at the mall, how long the customer stays at the mall, what the customer does when the customer comes to the mall, etc. The analytics may be performed on a customer-by-customer basis or data from multiple customers may be aggregated into a single analytic. The single analytic may relate to the entire customer base of the mall 150 or may relate to information by demographics (e.g., sex, race, age group, etc.).

Customer information is transmitted to other mall devices at 712. The customer information includes a name of the customer. In some arrangements, the customer information includes a picture of the customer. In further arrangements, the customer information includes other information relating to the customer, such as the customer's age, known family members, the type of car the customer drives, favorite stores, and any other customer information that may be used to provide a personalized shopping experience at the mall 150. The customer information is received at the other mall devices at 714. The other mall devices may relate to mobile computing devices carried by employees of the mall, such as valet attendants and mall greeters. The information enables the employees to provide a personalized shopping experience by greeting the customers by name and knowing basic information about the customers.

Location-specific information is transmitted to the mobile device 110 at 716. The location-specific information may include location-specific user interfaces (e.g., user interfaces of the mall application in which the customer interacts with); location-specific and/or customer specific advertisements, promotions, and events; digital valet tickets; parking reminders (e.g., providing the customer an indication where the customer parked his car); and the like. The location-specific information is received at 718. In some arrangements, the location-specific information is also rendered on the display 210 of the mobile device 110 at 718.

In method 700, 712 through 718 are optional. Not every received location triggers the sending of customer information at 712. For example, if a customer is exiting the mall and triggers a beacon along the exit lane of the driveway 618, customer information is not needed at any of the mall computing devices because the customer is leaving the premises of the mall 150. Similarly, not every beacon location triggers the sending of location-specific information to the mobile device 110 at 716. Using the same example, if the customer is exiting the mall and triggers a beacon along the exit lane of the driveway 618, there may be no relevant location-specific information to the exit lane of the driveway 618.

The following paragraphs detail various possible uses of the above described systems and methods.

Loyalty Program

In some arrangements, the above described systems and methods are used to provide a customer loyalty program. As described in further detail below, the customer loyalty program rewards customers for visiting the mall 150 and for performing various activities within the mall 150. A customers can sign up for a customer account with the mall 150. The customer accesses his account via a mall-specific application (e.g., a smartphone application) running on the customer's mobile device 110. Once logged into his account, the customer's location and activity can be reported back to the mall computer system 140.

The mall computing system 140 awards points to the customer and associates the points with a customer account. The customer earns points for performing a variety of activities associated with the mall. For example, the customer can earn points by entering the main building 602 of the mall 150. More points may be earned if the duration of stay in the main building 602 exceeds a certain amount of time (e.g., the customer may earn another point for every thirty minutes the customer remains in the main building 602). The customer can earn points by using services offered by the mall 150, such as valet parking services. The customer can earn points by arriving at a designated location (e.g., the second merchant 606) within the mall 150 at a designated time. The customer can earn points by arriving at a sequence of places at designated times (e.g., by competing in a scavenger hunt within the mall 150). The points earned for being in the mall 150 may be earned as a soft check-in or a fast check-in because no customer action is required.

The customer may earn points based on purchases made in the mall 150. The purchases can be for mall services (e.g., valet parking) or merchant services or goods (e.g., clothing, movie tickets, dinner, etc.). Points may be awarded for all purchases (e.g., 1 point for every $1 spent at the mall 150). Alternatively, points may be awarded for purchasing only certain goods or services (e.g., to promote certain goods or services). The amount of points awarded may be variable based on activities of related customers. For example, if a first customer enters an area and purchases an item, the first customer may receive a first amount of points. If a second customer (e.g., a friend of the first customer) enters the same area and purchases the item within a designated time limit, but the first and second customers may earn a second amount of points that is greater than the first amount of points (e.g., as an expiring offer). Merchants 604 through 610 may pay the mall 150 to award points to customers for purchasing certain goods or services at the merchants 604 through 610 to promote the merchant or a good or service offered by the merchant. Customers can be automatically credited with points for purchases made through the mall application (e.g., purchases made via gift cards stored on the mall application, purchases made via a mobile wallet associated with the mall application, etc.). Customers can also receive credit for purchases made independent of the mall application. For example, a customer can make a traditional purchase at the mall 150 (e.g., with cash or a credit card) and receive a receipt for the purchase. The customer can then take a picture of the receipt with a camera of the mobile device 110. The picture of the receipt is transmitted from the mobile device 110 to the mall computer system 140. The mall computer system 140 can perform optical character recognition on the receipt or read a barcode on the receipt to determine if (1) the purchase qualifies for points and (2) how many points should be awarded for the purchase. The mall computer system 140 may contact the appropriate merchant computer system 120 for verification of the purchase prior to awarding any points to the customer.

As the customer accrues points, the customer can redeem the points for various prizes or rewards. The prizes may include gift cards to any merchant within the mall 150, gift cards to a specific merchant within the mall 150, free valet parking certificates, free movie tickets, coupons, and the like. The prizes or rewards can be digital prizes associated with the customer account and viewable/redeemable via the customer's mobile device 110. For example, the mall application running on the mobile device 110 may include a rewards interface. The rewards interface allows the user to select any received prize or reward, which may then be displayed as a barcode (e.g., for scanning at a merchant's point of sale system) or transmitted to a merchant computer system 120 for redemption.

Parking Enhancements

The above described systems and methods can be used to provide an enhanced parking experience for customers of the mall 150. As described above, through the computing system 100, the mall computer system 140 is aware of when customers are approaching the mall 150 (e.g., by detecting the presence of a customer traveling along the driveway 618 towards the valet area 614 or the parking lot 616). As the customer approaches the valet area 614, customer information can be transmitted to a computing device at the valet area 614 (e.g., a computer at the valet kiosk used by the valet attendants). The customer information may include the customer's name and a picture of the customer such that the valet attendant can greet the customer by name when the customer arrives at the valet area 614. In some arrangements, the customer information includes additional information such as the names of family members, the type of car the customer drives, and the like.

The above described computing system 100 also provides for a digital claim ticket. A traditional valet parking system relies on a paper claim ticket. In the traditional system, the valet attendant exchanges a paper claim ticket for the customer's car keys. Here, the computing system 100 permits digital claim tickets. If the customer has an account with the mall 150 or with the valet company operating the valet area 614, the customer can receive a digital claim ticket (e.g., a digital token). Accordingly, after the customer provides the valet attendant the keys to the car, the valet attendant sends a parking confirmation, via a valet computing device, to the mall computer system 140, and in response to the parking confirmation, the mall computer system 140 pushes a digital claim ticket to the mobile device 110 of associated with the customer. The digital claim ticket includes the information about the valet parking (e.g., cost, waivers of liability, etc.) and information used by the customer to redeem the claim ticket and pick up the car (e.g., a confirmation number, a reservation number, a barcode, a ticket number, etc.). When the customer is ready to pick-up the car, the customer can transmit a message to the valet attendant (e.g., as the customer is finishing shopping) such that the valet attendant can have the customer's car waiting as the customer exits the main building 602. In some arrangements, the mall computer system 140 can determine that the customer is exiting the mall and walking towards the valet area 614 and automatically trigger the message to the valet attendant. The use of digital claim tickets also permit customers to digitally pay for the valet parking service (e.g., through a digital wallet associated with the mall application, through a gift card associated with the mall application, through a coupon associated with the mall application, through accumulated customer loyalty points, etc.).

In situations in which the customer self-parks in the parking lot 616, the approximate area of the customer's parked car can be noted and sent to the mall application on the customer's mobile device 110. The mall application may include a "Where Did I Park?" feature that records the approximate location of the customer's car (e.g., near light post C2, near spot number 74, etc.). The approximate location of the customer's car may be shown on a map of the parking lot 616. In arrangements where the mobile device 110 includes a GPS receiver or another location sensor (e.g., locations sensor 214), the location of the customer's car may be determined more precisely than relying on only the received beacon identifiers. A reminder of the car's approximate location can be automatically pushed to the customer as the customer walks out of the main building 602 and towards the parking lot 616.

Customized Greetings and Signage

As described above with in the valet parking use case, the mall computer system 140 is aware when customers of the mall 150 are approaching the mall and specific locations within the mall. Accordingly, as the customer is approaching the main building 602 or a certain position within the main building 602 (e.g., the first merchant 604), the mall computer system 140 can transmit customer information to specific mall computing devices. In some arrangements, the mall computing device that receives the customer information is a computing device carried by a greeter of the mall or a specific merchant within the mall. Since the greeter has the customer information (e.g., the customer's name, a picture of the customer, etc.), the greeter can greet the customer by name as he or she enters the main building 602 or the specific merchant's space within the mall 150. In some arrangements, the mall computing device relates to a digital advertisement positioned within the mall (e.g., an advertisement for a movie playing at a movie theater in the mall). The advertisement can be customized on a customer-by-customer basis depending on which customers are near or approaching the advertisement. For example, if Jenna is approaching the advertisement, the advertisement may display "Jenna, come spend the rainy day watching the latest thriller at the movie theater on level 2."

Reservations

The above described systems and methods allow for advanced reservation systems for customers of the mall 150. In some arrangements, the mall 150 includes restaurants and other retailers that require appointments, reservations, or offer services on a first-come, first-serve basis. In situations where a customer has a reservation at a restaurant in the mall 150 (e.g., at the third retailer 608), as the customer approaches the mall 150, the mall computer system 140 can transmit an indication to the merchant computer system 120 of the restaurant to indicate that the customer is approaching. In response, the merchant computer system 120 can transmit any necessary information to the mobile device 110 of the customer relating to the reservation (e.g., specials, an indication that the table is ready, an indication that the restaurant is running late, etc.). Similarly, for merchants operating on a first-come, first-serve basis, the customer can remotely check into the merchant via the mobile device 110. The mall computer system 140 can verify that the customer is indeed in the vicinity of the merchant, and transmit the check-in to the appropriate merchant computer system 120. The mall computer system 140 can also transmit a notification to the merchant computer system 120 if the customer leaves the mall 150 such that the customer gives up his or her spot in line.

Message Other Nearby Customers

The above described systems and methods allow customers of the mall 150 to communicate with other nearby customers. The mall computer system 140 identifies customers that are within a certain distance of each other (e.g., 100 feet). Through a chat feature of the mall application running on the mobile devices 110, the mall computer system 140 can populate a list of potential messaging contacts. The messaging contacts may be limited by individual customers to be identified friends and family or may be open to any nearby contact. The messaging occurs over a direct peer-to-peer messaging protocol (e.g., a direct Bluetooth connection between two mobile devices, a connection via the Apple Multipeer technology, etc.). The direct peer-to-peer messaging protocol does not rely on a cellular data plan of the customer.

In-Mall Navigation and Augmented Reality

Often, customers can get disoriented or lost in large malls. Malls position kiosks having maps and directories at various places within the mall (e.g., at the entrances and exits). However, locating one of these kiosks can often be more time consuming than anticipated. Accordingly, the above described systems and methods can provide customized navigation directions to customers of the mall 150. Instead of visiting a kiosk, the customer can use the mobile device 110 to display a map of the mall 150. The customer can select a spot in the mall (e.g., the first merchant 604) and select an option to navigate to that location. Because the mall computer system 140 is aware of where the customer is in the mall 150, the mall computer system 140 can transmit customized navigation steps (e.g., a route, turn-by-turn steps, etc.) to the mobile device 110 for presentation to the customer.

Similarly, the computer system 100 can provide an augmented reality experience to customers of the mall 150 via the mobile devices 110. Since the mall computer system 140 is aware of where the mobile devices 110 are within the mall 150, the mall computer system 140 can push location specific information as an overlay to a video feed from the mobile device 110 camera. The augmented reality features may also utilize various sensors of the mobile devices 110 (e.g., gyroscopes, GPS, accelerometers, etc.) to provide a more accurate customer experience.

Customer Data

The mall computer system 140 gathers a substantial amount of information relating to customers of the mall 150. The gathered information relates to the locations of customers at specific times within the mall 150, days when the customers visit the mall 150, duration of visits to the mall 150, what the customer purchases (e.g., as a result of the above described rewards/loyalty program), favorite items to purchase, amount of customer purchases, frequency of customer purchases, etc. The data is received for all customers utilizing the mall application on mobile devices 110 (either anonymously or associated with identified customers). The data is used by the mall computer system 140 to perform various customer analytics and to calculate customer trends. The analytics and trends may help the mall 150 target customers with more effective advertisements and promotions, target customers with customer-specific advertisements and promotions, determine ideal merchant tenants, etc. The owner and/or operator of the mall 150 can also sell the data (either raw data or end result analytics and trends) to third parties (e.g., merchants in the mall, outside parties, etc.). The sale of this data may help smaller retailers (e.g., a retailer that does not have the customer tracking infrastructure of larger, national retailers) to compete with larger retailers in understanding customer shopping trends.

Customer Specific Advertisements/Promotions

As discussed above, the mall computer system 140 gathers a substantial amount of information relating to customers of the mall 150 and determines customer trends and patterns. The trends and patterns can be used to present the customers customer-specific advertisements and promotions based on an individual customer's shopping trends and patterns. The advertisements can be pushed directly to the mobile device 110 of the customer. Alternatively or additionally, digital advertisements within the mall can be customized when the customer is determined to be in the vicinity of the advertisement.

The above described systems and methods allow malls and retailers to incorporate new features into their customer applications (e.g., smartphone applications). The new features provide a more personalized and enjoyable shopping experience to customers of the malls and retailers. Additionally, the new features may provide a single point of integration to a platform (e.g., the main mall application) for services offered by third-parties, such as mobile wallet and mobile gift card services. Additionally, the mall computer system 140 may be hosted by a third-party entity, such as a financial institution, to take advantage of the financial institutions large data capacity, large processing capacity, data security, data analytics, payment systems, and experience in integrating with third parties. Although described in the context of a mall, the above-described systems and methods may be used to provide location-specific information to people in other locations, such as university campuses, cruise ships, museums, bank branches, sports arenas, airports, and the like.

The embodiments of the present invention have been described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing system in the form of computers, including a processing unit, a system memory or database, and a system bus that couples various system components including the system memory to the processing unit. The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. User interfaces, as described herein may include a computer with monitor, keyboard, a keypad, a mouse, joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention.

Throughout the specification, numerous advantages of the exemplary embodiments have been identified. It will be understood of course that it is possible to employ the teachings herein without necessarily achieving the same advantages. Additionally, although many features have been described in the context of a particular data processing unit, it will be appreciated that such features could also be implemented in the context of other hardware configurations.

While the exemplary embodiments illustrated in the figures and described above are presently preferred, it should be understood that these embodiments are offered by way of example only. Other embodiments may include, for example, structures with different data mapping or different data. The invention is not limited to a particular embodiment, but extends to various modifications, combinations, and permutations that nevertheless fall within the scope and spirit of the appended claim.

What is claimed is:

1. A method of providing location-specific content to a customer of a shopping center, the method comprising:
   receiving, by a computing system including a processor and a memory, a first beacon identifier relating to a first location of a mobile device associated with the customer;
   determining, by the computing system, the first location of the mobile device based on the first beacon identifier;
   storing, by the computing system, location information relating to the first location with a customer entry in a customer database, the customer entry associated with the customer, wherein the customer database includes, customer, location, and purchase information relating to a plurality of customers;
   providing, by the computing system, the customer information relating to the customer to a shopping center computing device;
   determining an amount of at least one loyalty point, wherein the amount is determined based on a presence of the customer at the first location, a presence of a second customer at the first location, and whether the customer and the second customer purchase a same item at the first location;
   awarding, by the computing system, the at least one loyalty point to an account of the customer in response to determining that the mobile device associated with the customer is at the first location, wherein the amount of the at least one loyalty point awarded is increased in response to determining that the customer and the second customer purchase the same item and that the purchase qualifies for at least one loyalty point,
      wherein the purchase qualifies for at least one loyalty point is determined using optical character recognition of a receipt for the purchase via a camera of the mobile device; and
   displaying, by the computing system, a rewards interface comprising accrued loyalty points for goods or services offered at the shopping center.

2. The method of claim 1, wherein the customer can redeem the loyalty points for goods or services offered at the shopping center using the displayed rewards interface.

3. The method of claim 2, further comprising receiving, by the computing system, a request to redeem the accrued loyalty points associated with the account of the customer from the mobile device.

4. The method of claim 3, further comprising associating, by the computing system, a gift card with the account of the customer, wherein the gift card is redeemable by the customer via the mobile device.

5. The method of claim 1, wherein the shopping center computing device is associated with an employee of the shopping center.

6. The method of claim 5, wherein the shopping center computing device is a valet computing device or a greeter computing device.

7. The method of claim 5, wherein the information includes a name of the customer and a picture of the customer.

8. The method of claim 1, further comprising performing an analytic on the location and purchase information relating to the plurality of customers.

9. The method of claim 8, further comprising transmitting, through a transceiver of the computing system, the analytic to a merchant computing system.

10. The method of claim 8, further comprising transmitting, by the computing system, an advertisement or promotion specific to a demographic group to which the customer belongs, to the mobile device based at least in part on the analytic by demographics.

11. The method of claim 1, further comprising transmitting a customer-specific advertisement or promotion to the mobile device based at least in part on the customer being at the first location.

12. The method of claim 1, further comprising transmitting a customer-specific advertisement to a digital advertisement display near the first location.

13. The method of claim 1, wherein the first location relates to an area of a parking lot, the method further comprising transmitting a reminder message to the mobile device, the reminder message including an indication of the area of the parking lot.

14. The method of claim 1, wherein the first location relates to a valet parking area, and wherein the method further comprising:

receiving, by the computing system, a parking confirmation relating to the customer from a valet computing device; and transmitting, by the computing system, a digital claim ticket to the mobile device, the digital claim ticket including a ticket number used to redeem the digital claim in picking up a vehicle.

15. The method of claim 14, further comprising:
receiving, by the computing system, the digital claim ticket from the mobile device; and
transmitting, by the computing system, the digital claim ticket to the valet computing device.

16. The method of claim 1, wherein the first location relates to a restaurant, and wherein the method further comprises transmitting a reservation check-in associated with the customer to a restaurant computing system.

17. The method of claim 1, further comprising:
determining, by the computing system, a plurality of other customers in a vicinity of the customer based on the first location;
populating, by the computing system, a chat list with the plurality of other customers such that the customer can engage in peer-to-peer messaging with any of the plurality of other customers via the mobile device.

18. The method of claim 1, further comprising:
receiving, by the computing system, a navigation request from the mobile device to navigate from the first location to a designated location; and
transmitting, by the computing system, step-by-step navigation instructions to the mobile device.

19. The method of claim 1, further comprising determining, by the computing system, a direction and a speed in which the customer is traveling based at least in part on the first location.

20. A computing system for providing location-specific content to a customer of a shopping center, the customer being associated with a customer device, the system comprising:
a plurality of beacons positioned at different locations of the shopping center, each of the plurality of beacons including a radio frequency transmitter that transmits a beacon identifier, wherein the each of the beacons is associated with a different beacon identifier;
a mall computing system having a network interface configured to permit data communication between the mall computing system and a plurality of mobile devices associated with a plurality of customers of the shopping center, a memory, and a processor configured to:
receive a first beacon identifier of a first beacon of the plurality of beacons, the first beacon identifier relating to a first location of a mobile device associated with the customer, determine the first location of the mobile device based on the first beacon identifier,
store location information relating to the first location with a customer entry in a customer database, the customer entry associated with the customer, wherein the customer database includes customer, location, and purchase information relating to a plurality of customers,
provide the customer information relating to the customer to a shopping center computing device,
determine an amount of at least one loyalty point, wherein the amount is determined based on a presence of the customer at the first location, a presence of a second customer at the first location, and whether the customer and the second customer purchase a same item at the first location,
award the at least one loyalty point to an account of the customer in response to determining that the mobile device associated with the customer is at the first location, wherein the amount of the at least one loyalty point awarded is increased in response to determining that the customer and the second customer purchase the same item and that the customer remained in the first location for a pre-defined period of time,
wherein the determination that the customer remained in the first location for the pre-defined period of time is based on the computing system receiving the first beacon identifier for the mobile device for the pre-defined period of time, and
display a rewards interface comprising accrued loyalty points for goods or services offered at the shopping center.

21. The system of claim 20, wherein the customer can redeem the loyalty points for goods or services offered at the shopping center using the displayed rewards interface.

22. The system of claim 21, wherein the processor is further configured to receive a request to redeem the accrued loyalty points associated with the account of the customer from the mobile device.

23. The system of claim 22, wherein the processor is further configured to associate a gift card with the account of the customer, wherein the gift card is redeemable by the customer via the mobile device.

24. The system of claim 20, wherein the shopping center computing device is associated with an employee of the shopping center.

25. The system of claim 24, wherein the shopping center computing device is a valet computing device or a greeter computing device.

26. The system of claim 24, wherein the information includes a name of the customer and a picture of the customer.

27. The system of claim 20, wherein the processor is further configured to perform an analytic on the location and purchase information relating to the plurality of customers.

28. The system of claim 27, wherein the processor is further configured to transmit, through the network interface, the analytic to a merchant computing system.

29. The system of claim 27, wherein the processor is further configured to initiate a transmission an advertisement or promotion specific to a demographic group to which the customer belongs, to the mobile device based at least in part on the analytic by demographics.

30. The system of claim 20, wherein the processor is further configured to initiate a transmission of a customer-specific advertisement or promotion to the mobile device based at least in part on the customer being at the first location.

31. The system of claim 20, wherein the processor is further configured to initiate a transmission of a customer-specific advertisement to a digital advertisement display near the first location.

32. The system of claim 20, wherein the first location relates to an area of a parking lot, and wherein the processor is further configured to initiate a reminder message to the mobile device, the reminder message including an indication of the area of the parking lot.

33. The system of claim 20, wherein the first location relates to a valet parking area, and wherein the processor is further configured to:

receive a parking confirmation relating to the customer from a valet computing device; and transmit a digital claim ticket to the mobile device, the digital claim ticket including a ticket number used to redeem the digital claim in picking up a vehicle.

34. The system of claim 33, wherein the processor is further configured to:
receive the digital claim ticket from the mobile device; and
transmit the digital claim ticket to the valet computing device.

35. The system of claim 20, wherein the first location relates to a restaurant, and wherein the processor is further configured to transmit a reservation check-in associated with the customer to a restaurant computing system.

36. The system of claim 20, wherein the processor is further configured to:
determine a plurality of other customers in a vicinity of the customer based on the first location;
populate a chat list with the plurality of other customers such that the customer can engage in peer-to-peer messaging with any of the plurality of other customers via the mobile device.

37. The system of claim 20, wherein the processor is further configured to:
receive a navigation request from the mobile device to navigate from the first location to a designated location; and transmit step-by-step navigation instructions to the mobile device.

38. The system of claim 20, wherein the processor is further configured to determine a direction and a speed in which the customer is traveling based at least in part on the first location.

39. The method of claim 1, wherein the amount of at least one loyalty point further corresponds to a period of time that the mobile device remains at the first location.

40. The method of claim 1, wherein the amount of the at least one loyalty point is determined further in response to a determination that the mobile device associated with the customer visited a plurality of locations in a pre-defined order, the plurality of locations being determined based on a plurality of beacon identifiers.

41. The method of claim 1, further comprising contacting a merchant computer system for verification of the determination that the purchase qualifies for at least one loyalty point.

42. The system of claim 20, wherein the determination that the customer remained in the first location for the pre-defined period of time is based on the mobile device remaining within a geo-fenced area established by a beacon associated with the first beacon identifier.

* * * * *